United States Patent
Brahma et al.

(10) Patent No.: US 8,611,410 B2
(45) Date of Patent: Dec. 17, 2013

(54) VARIABLE MODULUS MECHANISM FOR PERFORMING EQUALIZATION WITHOUT A PRIORI KNOWLEDGE OF MODULATION TYPE OR CONSTELLATION ORDER

(75) Inventors: Pratik Prabhanjan Brahma, Kharagpur (IN); Baijayanta Ray, Bangalòre (IN)

(73) Assignee: National Instruments Corporation, Austin, TX (US)

( * ) Notice: Subject to any disclaimer, the term of this patent is extended or adjusted under 35 U.S.C. 154(b) by 284 days.

(21) Appl. No.: 12/977,467

(22) Filed: Dec. 23, 2010

(65) Prior Publication Data
US 2012/0027072 A1   Feb. 2, 2012

(30) Foreign Application Priority Data
Jul. 30, 2010   (IN) .......................... 1794/DEL/2010

(51) Int. Cl.
*H04L 27/01*   (2006.01)
(52) U.S. Cl.
USPC ........... 375/232; 375/233; 375/324; 375/340; 375/346; 375/350
(58) Field of Classification Search
CPC .............. H01L 25/0305; H01L 2025/03611; H01L 2025/03617; H01L 2025/0363; H01L 2025/03675; H01L 2025/03057
USPC .......... 375/229–235, 316, 324, 340, 346, 350
See application file for complete search history.

(56) References Cited

U.S. PATENT DOCUMENTS

| | | | | |
|---|---|---|---|---|
| 5,940,440 A | * | 8/1999 | Werner et al. ................. | 375/231 |
| 6,904,087 B2 | * | 6/2005 | Li ................................. | 375/232 |
| 7,418,033 B2 | * | 8/2008 | Barksdale ..................... | 375/232 |
| 8,064,542 B1 | * | 11/2011 | Lee ............................... | 375/324 |
| 8,184,819 B2 | * | 5/2012 | Malvar et al. ................ | 381/71.1 |
| 2004/0264558 A1 | * | 12/2004 | Chae et al. ..................... | 375/148 |
| 2011/0261867 A1 | * | 10/2011 | Hu et al. ........................ | 375/224 |

OTHER PUBLICATIONS

D.N. Godard, "Self-Recovering Equalization and Carrier Tracking in Two-Dimensional Data Communication Systems," IEEE Transactions on Communications, vol. 28, No. 11, Nov. 1980, pp. 1867-1875.
C. R. Johnson, Jr., P. Schniter, T. J. Endres, J. D. Behm, D. R. Brown, and R. A. Casas, "Blind Equalization Using the Constant Modulus Criterion: A Review," Proceedings of the IEEE, vol. 86, No. 10, 1998, pp. 1927-1950.

* cited by examiner

*Primary Examiner* — Sophia Vlahos
(74) *Attorney, Agent, or Firm* — Meyertons Hood Kivlin Kowert & Goetzel, P.C.; Jeffrey C. Hood; Mark K. Brightwell

(57) ABSTRACT

A system, method and memory medium for performing blind equalization. A block $\{u_n\}$ of the baseband samples is received. A function J of a vector f is minimized to determine a minimizer $f_{MIN}$. The function J depends on vector f according to $J(f)=\Sigma(|y_n|^2-\gamma)^2$. The summation $\Sigma$ corresponds to a sequence $\{y_n\}$ of equalized samples. The sequence $\{y_n\}$ of equalized samples is related to the block $\{u_n\}$ according to a convolution relation $\{y_n\}=\{u_n\}*f$. Parameter $\gamma$ is a current modulus value. The current modulus value $\gamma$ is updated to equal a ratio of a fourth moment of the sequence $\{y_n\}$ to a second moment of the sequence $\{y_n\}$. The minimization and parameter update operations are repeated for a series of received blocks of baseband samples. The minimizer $f_{MIN}$ from a last of the repetitions is used to determine final equalized samples.

20 Claims, 7 Drawing Sheets embodiment 900A

VARIABLE MODULUS MECHANISM FOR PERFORMING EQUALIZATION WITHOUT A PRIORI KNOWLEDGE OF MODULATION TYPE OR CONSTELLATION ORDER

RELATED APPLICATION DATA

This application claims the benefit of priority under 35 U.S.C. 119 to Indian Provisional Application No. 1794/DEL/2010, filed with the Patent Office of India on Jul. 30, 2010, titled "Various Receiver Systems and Methods", and invented by Baijayanta Ray, Nikhil Ashok Deshmukh, Pratik Prabhanjan Brahma, Ankit Sethi, Kunal Agarwal, Sartaj Chaudhury, and Utkarsh Gupta. That provisional application is hereby incorporated by reference in its entirety as though fully and completely set forth herein.

FIELD OF THE INVENTION

The present invention relates to the field of telecommunication, and more specifically, to systems and methods for performing blind equalization of received signals, to compensate for the distortion introduced by a communication channel.

DESCRIPTION OF THE RELATED ART

A transmitter receives a sequence of data bits, maps the sequence of data bits into a sequence $\{x_k\}$ of symbols, modulates a carrier signal (or an orthogonal pair of carrier signals) based on the symbol sequence $\{x_k\}$ to obtain a modulated signal, and transmits the modulated signal onto a communication channel. A receiver receives a distorted version of the transmitted signal from the communication channel. The receiver may capture a sequence $\{u_n\}$ of samples of the received signal and perform equalization on the sequence $\{u_n\}$ in order to compensate for the distorting effects of the channel. Equalization involves computing an equalization vector f, and convolving the equalization vector f with the sequence $\{u_n\}$ to obtain an equalized sequence $\{y_n\}$. The receiver may operate on the equalized sequence to recover a stream of information bits.

In classical equalization, the transmitter injects a training sequence into the transmitted symbol sequence $\{x_k\}$. The training sequence is known by the receiver, and thus, the receiver may adapt its equalization vector until the equalized output sequence $\{y_n\}$ matches the training sequence. The equalization vector resulting from the adaptation may be used to equalize unknown portions of the received signal.

In the absence of a training sequence (or knowledge of the training sequence), the receiver may employ the so-called "constant modulus algorithm" (CMA) to equalize the received signal. The CMA is described in "Self-recovering equalization and carrier tracking in two-dimensional data communication systems", D. N. Godard, IEEE Transactions on Communications, Vol. 28, No. 11, pp. 1867-1875, November 1980.

The basic principle of the CMA is to minimize a cost function $J_{CMA}$ over the space of equalization vectors f. The cost function $J_{CMA}$ is given by the expression:

$$J_{CMA}(f) = E\{(|y_n|^2 - \gamma)^2\}, \tag{1}$$

where $\{y_n\}$ is the sequence of equalized samples derived from the received sample sequence $\{u_n\}$ by convolution with equalization vector f: $\{y_n\} = \{u_n\} * f$. The cost function given in expression (1) is the cost function for a 2-2 CMA.

The notation $E[s_n]$ denotes the expected value of the sequence $\{s_n\}$. The expected value $E[s_n]$ may be computed by taking an average over the range of index n. For example, where index n runs from 0 to N−1, the expected value $E[s_n]$ may be computed based on the expression:

$$E[s_n] = \frac{1}{N} \sum_{n=0}^{N-1} s_n.$$

The cost function $J_{CMA}$ involves a constant modulus parameter $\gamma$ given by:

$$\gamma = \frac{E[|x_k|^4]}{E[|x_k|^2]}, \tag{2}$$

where $\{x_k\}$ is a sequence of the transmitted symbols. The value of $\gamma$ for a constant modulus signal such as PSK is constant. (A signal is said to be a "constant modulus signal" whenever all the points in the modulation constellation have the same modulus (i.e., radius) in the complex plane.) However, prior works have suggested that the CMA is also able to equalize non-constant modulus signals such as QAM of modulation order greater than 8. (See "Blind Equalization Using the Constant Modulus Criterion: A Review", C. R. Johnson, Jr., P. Schniter, T. J. Endres, J. D. Behm, D. R. Brown, and R. A. Casas, Proceedings of the IEEE, Vol. 86, No. 10, pp 1927-1950, 1998.) (The modulation order of a modulation scheme is the number of points in its constellation.) In such cases, the value of $\gamma$ will be a constellation-dependent parameter.

The CMA performs a stochastic gradient-decent algorithm to determine a minimizing equalization vector f. (The equalization vector f represents the impulse response of the receiver's equalizer.)

Unfortunately, the CMA suffers from two major limitations.

First, the CMA uses a fourth order moment (e.g., $\gamma = E[|x_k|^4]/E[|x_k|^2]$) in its cost function. The value of the parameter $\gamma$ should be approximately known to the receiver. However, this parameter cannot be held constant if the modulation density (i.e., the number of points in the constellation) changes significantly. Thus, the CMA is not an appropriate solution for blind equalization of a wide variety of modulation schemes with different densities, without any side information.

Second, the CMA typically takes a large number of symbols to converge.

Thus, there exists a need for systems and methods capable of performing equalization even when the modulation scheme and/or constellation is unknown.

SUMMARY

In one set of embodiments, a method for performing blind equalization on received samples may involve the following operations:

(a) receiving a block $\{u_n\}$ of the received samples;

(b) minimizing a function J of a vector argument f to determine a minimizing vector $f_{MIN}$, wherein the function J depends on the vector argument f according to the expression $J(f) = \Sigma(|y_n|^2 - \gamma)^2$, wherein the summation $\Sigma$ corresponds to a sequence $\{y_n\}$ of equalized samples, wherein the sequence $\{y_n\}$ of equalized samples is related to the block $\{u_n\}$ of received samples according to a convolution relation $\{y_n\}=\{u_n\}*f$, wherein γ is a current modulus parameter value;

(c) computing a fourth moment of the sequence $\{y_n\}$ corresponding to the minimizing vector $f_{MIN}$;

(d) computing a second moment of the sequence $\{y_n\}$ corresponding to the minimizing vector $f_{MIN}$;

(e) updating the current modulus parameter value γ to be equal to a ratio of the fourth moment to the second moment.

Furthermore, the method may also include: repeating (a) through (e) until a termination condition is satisfied; and convolving the received samples with the minimizing vector $f_{MIN}$ from a last of said repetitions of (a) through (e) to determine final equalized samples.

In some embodiments, the termination condition is the condition that a change in the current modulus parameter value γ between successive repetitions of (a) through (e) is smaller than a predetermined threshold.

In some embodiments, the method may further include: displaying a constellation plot of the final equalized samples via a display device.

In some embodiments, the method may also include: receiving user input identifying a modulation type and constellation order after said displaying the constellation plot; and demodulating the final equalized samples based on the identified modulation type and the identified constellation order in order to obtain a bit sequence.

In some embodiments, the method may also include: performing a cluster analysis on the final equalized samples to determine a constellation order implicit in the received samples.

In some embodiments, the process of minimizing the function J includes performing a stochastic gradient descent algorithm.

In some embodiments, the method operates without any a priori knowledge of the modulation type used to form the received samples.

In some embodiments, a next repetition of said minimizing starts with the minimizing vector $f_{MIN}$ determined in a current repetition of said minimizing.

The following numbered paragraphs describe various other embodiments.

1.1 A method for performing blind equalization (e.g., equalization without any knowledge of the modulation scheme or constellation order implicit in the received signal) on received samples, the method comprising: (a) receiving a block $\{u_n\}$ of the received samples; (b) minimizing a function J of a vector argument f to determine a minimizing vector $f_{MIN}$, wherein the function J depends on the vector argument f according to the expression $J(f)=E[(|y_n|^2-\gamma)^2]$, wherein E denotes an average over time index n, wherein $\{y_n\}$ is an equalized sequence that is related to the block $\{u_n\}$ of received samples according to a convolution relation $\{y_n\}=\{u_n\}*f$, wherein γ is a current modulus value; (c) computing a fourth moment of the equalized sequence $\{y_n\}$ corresponding to the minimizing vector $f_{MIN}$; (d) computing a second moment of the equalized sequence $\{y_n\}$ corresponding to the minimizing vector $f_{MIN}$; (e) setting the current modulus value γ equal to a ratio of the fourth moment to the second moment; repeating (a) through (e) until a termination condition is satisfied; equalizing the received samples using the minimizing vector $f_{MIN}$ from a last of said repetitions of (a) through (e) to determine a final equalized sequence.

1.2 The method of paragraph 1.1, wherein the termination condition is the condition that a change in the current modulus value γ between successive repetitions of (a) through (e) is smaller than a predetermined threshold.

1.3 The method of paragraph 1.1, further comprising: displaying the final equalized sequence via a display device, or more generally, driving an output device with an output signal derived from the final equalized sequence.

1.4 The method of paragraph 1.1, further comprising: demodulating the equalized sequence to recover a stream of information bits, and, generating an output signal based on the stream of information bits. The output signal may be supplied to an output device (such as a display or speaker or actuator) for presentation to a user.

BRIEF DESCRIPTION OF THE DRAWINGS

A better understanding of the present invention can be obtained when the following detailed description of the preferred embodiments is considered in conjunction with the following drawings.

Figure 1:
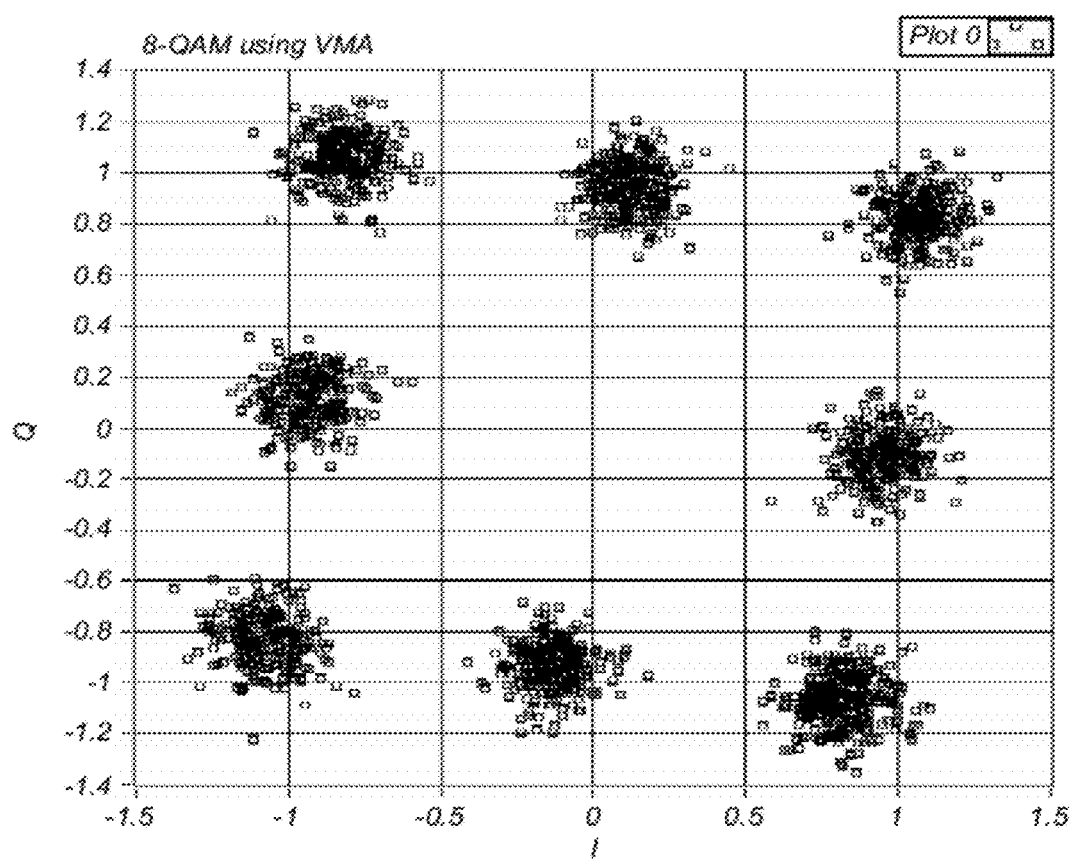
FIG. 1 shows a constellation plot of an 8-QAM signal equalized using one embodiment the variable modulus algorithm (VMA).

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

The following is a glossary of terms used in the present document.

Memory Medium—A memory medium is a medium configured for the storage and retrieval of information. Examples of memory media include: various kinds of semiconductor memory such as RAM and ROM; various kinds of magnetic media such as magnetic disk, tape, strip and film; various kinds of optical media such as CD-ROM and DVD-ROM; various media based on the storage of electrical charge and/or other physical quantities; media fabricated using various lithographic techniques; etc. The term "memory medium" may also include a set of two or more memory media which reside at different locations, e.g., at different computers that are connected over a network.

Programmable Hardware Element—a hardware device that includes multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. As used herein, the term "program" includes within its scope of meaning: 1) a software program which is stored in a memory and is executable by a processor, or, 2) a hardware configuration program useable for configuring a programmable hardware element. Any of the method embodiments described herein, or, any combination of the method embodiments described herein, or, any subset of any of the method embodiments described herein, or, any combination of such subsets may be implemented in terms of one or more programs.

Software Program—the term "software program" is intended to have the full breadth of its ordinary meaning, and includes any type of program instructions, code, script and/or data, or combinations thereof, that may be stored in a memory medium and executed by a processor or computer system. Exemplary software programs include: programs written in text-based programming languages such as C, C++, Java™, Pascal, Fortran, Perl, etc.; graphical programs (i.e., programs written in graphical programming languages); assembly language programs; programs that have been compiled to machine language; scripts; and other types of executable software. A software program may comprise two or more subprograms that interoperate in a specified manner.

Hardware Configuration Program—a program, e.g., a netlist or bit file, that can be used to program or configure a programmable hardware element.

Graphical Program—A program comprising a plurality of interconnected nodes or icons, where the plurality of interconnected nodes or icons visually indicate the functionality of the program. A graphical program is a type of diagram.

The following provides examples of various aspects of graphical programs. The following examples and discussion are not intended to limit the above definition of graphical program, but rather provide examples of what the term "graphical program" encompasses.

The nodes in a graphical program may be connected in one or more of a data flow, control flow, and/or, execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, where the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as a receiver (e.g., an RF receiver), a signal processing board, a modem (e.g., a cable modem), a network interface (e.g., a wired or wireless network interface), a unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, where the connections between the nodes indicate that data produced by one node is used by another node.

Node—In the context of a graphical program, an element that may be included in a graphical program. A node may have an associated icon that represents the node in the graphical program, as well as underlying code and/or data that implements functionality of the node. Exemplary nodes include function nodes, sub-program nodes (sub-VIs), terminal nodes, structure nodes, etc. Nodes may be connected together in a graphical program by connection icons or wires.

Graphical User Interface—this term is intended to have the full breadth of its ordinary meaning. The term "Graphical User Interface" is often abbreviated to "GUI". A GUI may include one or more input GUI elements, one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses.

A GUI may comprise a single window having one or more GUI Elements, or may comprise more than one window, each having one or more GUI Elements.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and that enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input, and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, switches, text input boxes, numeric input fields, etc.

Output Indicator—a graphical user interface element for displaying output from a program. Exemplary output indicators include charts, graphs, gauges, text output boxes, numeric displays, etc. An output indicator is sometimes referred to as an "output control".

Computer System—any of various types of computing or processing systems, including a personal computer (PC), a mainframe computer system, a workstation, a laptop, a table computer, a network appliance, an Internet appliance, a handheld or mobile device, a personal digital assistant (PDA), a television system, a grid computing system, or other device or combinations of devices. In general, the term "computer system" can be broadly defined to encompass any device (or combination of devices) having at least one processor that is configured to execute instructions that are stored on a memory medium.

Measurement Device—includes instruments, data acquisition devices, smart sensors and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card, a video capture board, a smart camera, a motion control device, a robot having machine vision, and other similar types of devices. Exemplary "stand-alone" instruments include oscilloscopes, multimeters, signal analyzers, signal demodulators, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, e.g., may receive and analyze data, and issue automation control signals in response.

Embodiments of the present inventions may be realized in any of various forms. For example, any of the present inventions may be realized as a computer-implemented method, a computer-readable memory medium, or a computer system. Furthermore, any of the present inventions may be realized using one or more custom-designed hardware devices such as ASICs or FPGA's.

A computer-readable memory medium is a memory medium that stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium. The memory medium stores program instructions. The processor is configured to read and execute the program instructions from the memory medium. The program instructions are executable by the processor to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a tablet computer, a wearable computer, etc.

In some embodiments, a set of computers distributed across a network may be configured to partition the effort of executing a computational method (e.g., any of the method embodiments disclosed herein). In some embodiments, a first computer may be configured to receive a modulated signal and perform demodulation on the modulated signal to generate a demodulated signal. The first computer may send the samples of the demodulated signal to a second computer through the network. The second computer may operate on the demodulated signal samples according to any of the method embodiments described herein, or, any combination of the method embodiments described herein, or, any subset of any of the method embodiments described herein, or, any combination of such subsets.

In one set of embodiments, the context of the present invention is as follows. A transmitter receives a stream of bits from a data source. The transmitter maps the bit stream into a stream $\{x_k\}$ of symbols. Each symbol $x_k$ of the symbol stream belongs to a set S in the complex plane. The set S is referred to as the "constellation". The constellation depends on the modulation scheme being used by the transmitter. The symbol stream is generated at a rate of 1/T symbols per second, where T is the symbol duration.

The transmitter modulates a carrier signal (or an orthogonal pair of carrier signals) based on the symbol stream $\{x_k\}$ to obtain a modulated signal, and transmits the modulated signal onto the channel. The channel may be a wireless channel or a wired channel. Typical examples for the channel include the atmosphere, free space, the ocean, coaxial cable, fiber optic cable and twisted pair cable.

A receiver receives a distorted version of the modulated signal from the channel and down-converts the received signal to obtain a baseband signal. The receiver samples the baseband signal, preferably at a rate higher than the symbol rate, in order to generate a sequence $\{u_n\}$ of complex samples. For example, in one embodiment, the baseband signal is sampled with a sampling rate equal to twice the symbol rate. Thus, in this embodiment, the time between successive samples of the sequence $\{u_n\}$ is T/2, where T is the symbol period.

The receiver includes an equalizer whose goal is to compensate for the distorting effects of the channel. The equalizer includes a discrete-time linear filter and a parameter estimation module.

The discrete-time linear filter generates a sequence $\{y_n\}$ of equalized samples by convolving the sample sequence $\{u_n\}$ with an impulse response f provided by the parameter estimation module:

$$\{y_n\} = \{u_n\} * f.$$

The impulse response f has finite length L and is represented by a set of L complex values and thus may be regarded as a vector of dimension 2L. The impulse response f will be referred to herein as the equalization vector f. The equalized samples $\{y_n\}$ may be down sampled to obtain a sequence $\{X_k\}$ that constitutes an estimate of the symbol stream $\{x_k\}$. For example, in the case where the received samples $\{u_n\}$ are captured at twice the symbol rate, the equalized samples $\{y_n\}$ would be down sampled by a factor of two.

The parameter estimation module is responsible for determining the equalization vector f to be used by the discrete-time linear filter. In particular, the parameter estimation module may estimate an optimal equalization vector $f_{on}$ based on the sample sequence $\{u_n\}$. The parameter estimation module may operate without knowledge of the modulation scheme and/or the constellation that is used by the transmitter to generate the symbol stream $\{x_k\}$.

In one set of embodiments, the parameter estimation module may compute the optimal equalization vector $f_{on}$ based on a "variable modulus algorithm" (VMA) as disclosed herein. The VMA may overcome one or more of the limitations of the constant modulus algorithm by iteratively adapting the value of parameter γ starting from a given initial value (e.g., the value one). The advantages of using the VMA may include one or more of the following.

1. The VMA operates without any a priori knowledge of the modulation scheme or constellation used by the transmitter.

2. For a 10-tap T/2 fractionally-spaced channel (i.e., a channel spreading over five symbol periods), it took 5000 received samples for the CMA to converge, whereas the VMA could bring in same level of equalization using only 3000 received samples. The channel coefficients used in this specific embodiment were:

0.0545+0.05i, 0.2832−0.1197i, −0.7676+0.2788i,
−0.0641+0.0576i, 0.0566+0.2275i, 0.4063+0.0739i,
0.2−0.3i, −0.9+0.3i, 0.05+0.06i, 0−0.7i.

3. For the same number of received symbols of a constant-amplitude continuous-phase frequency-modulated signal (such as Gaussian Minimum Shift Keying), the VMA converges to a significantly lower residual distortion as compared to the CMA for the same multipath conditions and same signal-to-noise ratio. (Residual distortion is defined as the mean square error between the transmitted symbol stream and the equalized symbol stream after removing any constant gain or phase error.)

Fractionally-Spaced Equalization

As described above, the equalizer performs equalization on the received sample sequence $\{u_n\}$ by convolving the received sample sequence with an optimal equalization vector $f_{OPT}$. While is it possible to achieve equalization when the received sample sequence is captured with a sample rate equal to the symbol rate, in the preferred embodiments the received sample sequence is captured at a rate higher than symbol rate, e.g., at some multiple of the symbol rate. Thus, in the preferred embodiments, the equalizer is referred to as a "fractionally-spaced equalizer" (FSE) since the time between successive coefficients in the equalization vector $f_{OPT}$ is a fraction of the symbol period T.

In one embodiment, the received sample sequence is captured at twice the symbol rate. In this case, the output sequence $\{y_n\}$ of the equalizer is decimated by a factor of two, e.g., by selecting every other sample.

The Variable Modulus Algorithm

In the VMA, the value of the modulus parameter γ is iteratively adapted. Each iteration $I_j$ of the VMA operates on a corresponding block $B_j$ of the received samples $\{u_n\}$ using a current value $\gamma_j$ of the modulus parameter. In particular, the VMA executes an optimization algorithm (e.g., a stochastic gradient descent algorithm) to minimize a cost function $J_{VMA}$ over the space of equalization vectors f based on the block $B_j$ of the received samples $\{u_n\}$ and the current modulus parameter value $\gamma_j$. The cost function $J_{VMA}$ has the form:

$$J_{VMA}(f) = E\{(|y_n|^2 - \gamma_j)^2\}, \quad (4)$$

The expectation E is based on a set of samples $y_n$ derived from the convolution of the block $B_j$ with the equalization vector f. For example, in one embodiment, $$J_{VMA}(f) = \frac{1}{L}\sum_{k=0}^{L-1}(|y_{jL+k}|^2 - \gamma_j)^2, \quad (5)$$

$$y_{jL+k} = \sum_{i=0}^{L-1} u_{jL+k-i} f(i), \quad (6)$$

where f(i) denotes the $i^{th}$ component of the equalization vector f, or equivalently, the value of impulse response f at time i. The notation |z| represents the modulus (radius) of the complex value z.

The minimization of the cost function results in a current minimizing vector $(f_{MIN})_j$. The samples $y_n$, obtained from the convolution of the block $B_j$ and the minimizing vector $(f_{MIN})_j$ are used to compute an updated modulus parameter value for the next iteration:

$$\gamma_{j+1} = E[|y_n|^4]/E[|y_n|^2]. \quad (7)$$

The minimization in the next iteration $I_{j+1}$ may start from the current minimizing vector $(f_{MIN})_j$. The iterations may continue until the parameter value $\gamma_j$ stabilizes, e.g., until the change in γ from one iteration to the next becomes sufficiently small:

$$\Delta \gamma_j = \gamma_j - \gamma_{j-1}$$

$$|\gamma_j| < \epsilon,$$

where ε is a small positive constant, e.g., a user-specified constant. In some embodiments, the sequence of parameter values $\{\gamma_j\}$ is smoothed, and the stabilization test is applied to the smoothed value instead of the parameter value itself.

In one alternative embodiment, the VMA performs a number of iterations that is determined by the sample length N of the received sample sequence $\{u_n\}$ and the sample length L of the impulse response f. For example, the number of iterations may be equal to N/L. In another alternative embodiment, the VMA performs a user-specified number of iterations.

As noted above, each iteration $I_j$ of the VMA operates on a corresponding block $B_j$ of the received sample sequence $\{u_n\}$. In some embodiments, the blocks are overlapping blocks that together cover the entirety of the received sample sequence. For example, in one embodiment, block $B_j$ is a block of sample length 2L which overlaps with the next block $B_{j+1}$ in its last L samples, e.g., as given by:

$$B_j = \{u_n : n = j*L+i, i=0, 1, 2, \ldots, (2L-1)\}$$

for j=0, 1, . . . , (N/L−1), where N is the number of samples in the received sample sequence, where L is the sample length of the impulse response f.

As noted above, each iteration $I_j$ of the VMA involves minimizing the cost function $J_{VMA}$ based on the block $B_j$ and the current modulus parameter value $\gamma_j$. A conventional gradient descent algorithm would minimize the cost function by performing repeated updates of the form:

$$f_{i+1} = f_i - \mu \nabla_f J_{VMA}(f_i), \qquad (8)$$

where $\mu$ is the step size, $\nabla_f$ is the gradient operator with respect to equalization vector f. However, in the preferred embodiment, the minimization is performed using a stochastic gradient descent algorithm. The stochastic gradient descent algorithm may perform repeated updates of the form:

$$f_{n+1} = f_n - \mu \nabla_f (|y_n|^2 - \gamma_j)^2, \qquad (9)$$

for n=jL+k, k=0, 1, 2, ..., (L−1).

The parameter L may take any value in a wide range of values. Similarly, the parameter $\mu$ make take any value in a wide range of values. In one particular embodiment, the parameters L and $\mu$ take the values 12 and 0.005 respectively.

Because the VMA iteratively adapts the modulus parameter $\gamma$, the initial value $\gamma_0$ of the modulus parameter may be chosen arbitrarily. In particular, the initial value $\gamma_0$ may be chosen without any a priori knowledge of the constellation properties. For example, the initial value $\gamma_0$ may be set to the value 1.0 independent of the modulation scheme and/or constellation order being used by the transmitter. The adaptation process guarantees that the modulus parameter will eventually converge to a value appropriate for the modulation scheme and constellation being used in any given situation.

In some embodiments, the advantages of the VMA may include one or more of the following.

1. The VMA operates without any a priori knowledge of the modulation scheme implicit in the received signal. In one embodiment, channel-affected signals of different modulation schemes like PSK (4,8,16,32) and QAM (4,8,16,32,64) were successfully tested for a SNR level of 20 dB and higher. The initialization of equalizer parameters was kept independent of the modulation scheme used in the transmitter and thus the fractionally-sampled received signal was the sole input to the VMA.

2. For a 10-tap fractionally-spaced channel (i.e., a channel spreading over five symbol periods), it took 5000 received samples of a 8-QAM modulated signal for the CMA to converge, whereas the VMA can achieve the same residual distortion using 3000 received samples only. The channel coefficients used in this specific embodiment were:

0.0545+0.05i, 0.2832−0.1197i, −0.7676+0.2788i,
−0.0641+0.0576i, 0.0566+0.2275i, 0.4063+0.0739i,
0.2−0.3i, −0.9+0.3i, 0.05+0.06i, 0−0.7i, and the signal-to-noise ratio was set to 25 dB. FIG. 1 shows the constellation plot of equalized signal $\{y_n\}$ given an 8-QAM modulated signal using VMA in a fractionally-spaced equalizer.

The mean squared distance and maximum deviation from mean of constellation clusters are used as measures to compare the convergence of VMA and CMA for the same data set. 2500 received symbols of a 4-QAM modulated signal are taken and the above measures were calculated for the output of both the equalizers.

The CMA equalized constellation had a mean square residual error of 11.631. The corresponding VMA output had a significantly lower mean square error of 5.583. In both cases, mean square error was computed by clustering the equalizer output into clusters corresponding to each of the points in the expected constellation and then computing the mean of each cluster.

Figure 2A:
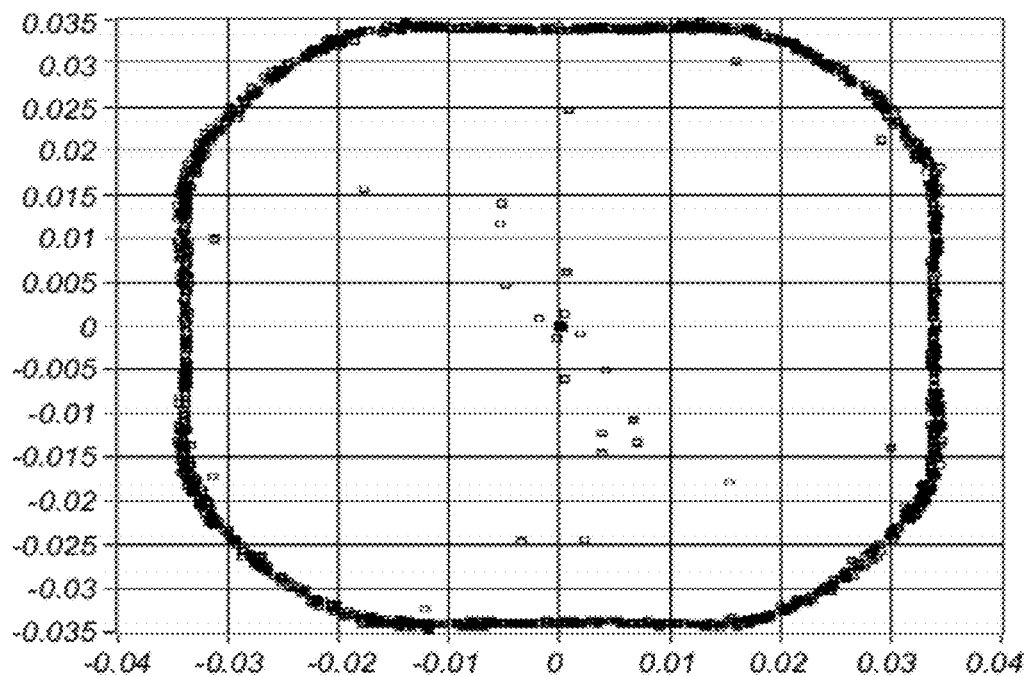
FIGS. 2A-2D are constellation diagrams of: (A) actual GMSK signal extracted from a GSM burst; (B) received signal after passing through channel and adding white Gaussian noise; (C) equalized output using CMA-FSE; and (D) equalized output using VMA-FSE.
Figure 2B:
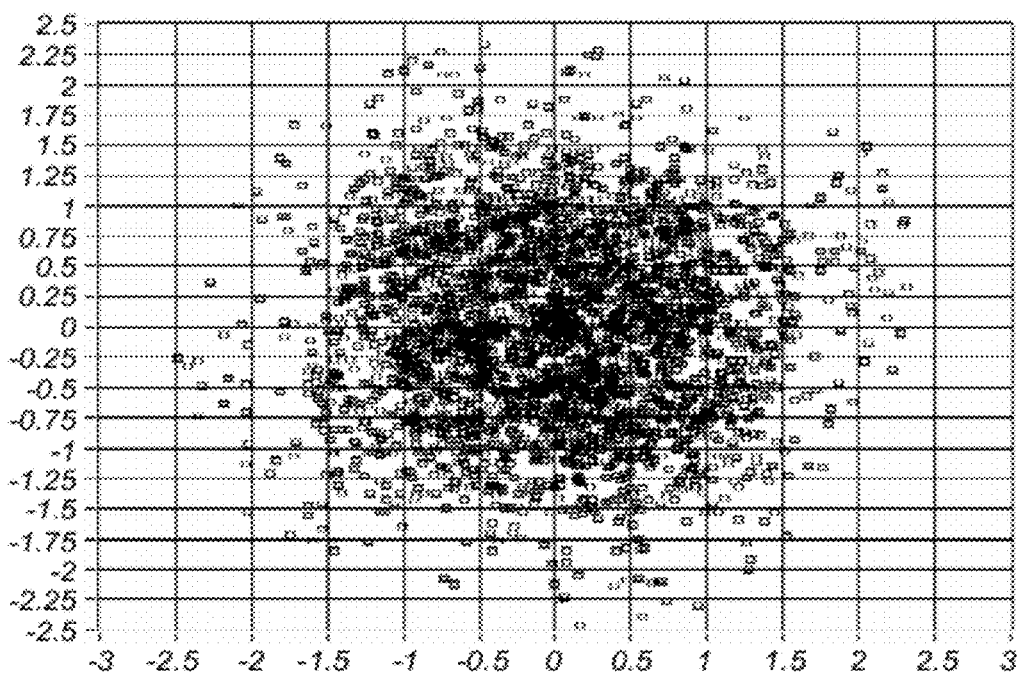
Figure 2C:
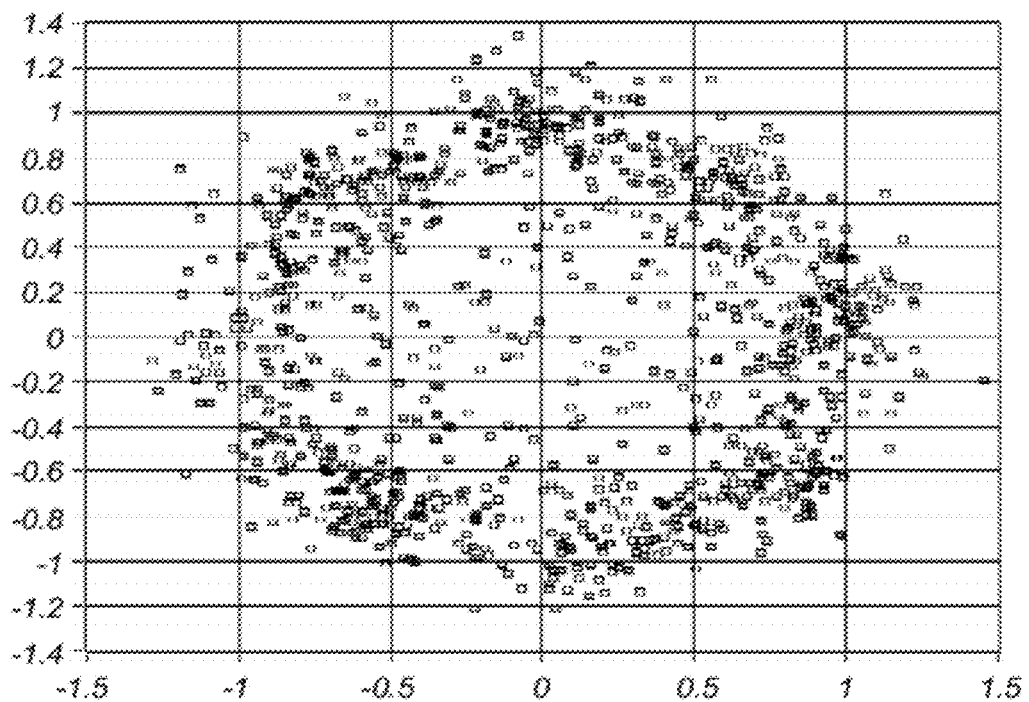
Figure 2D:
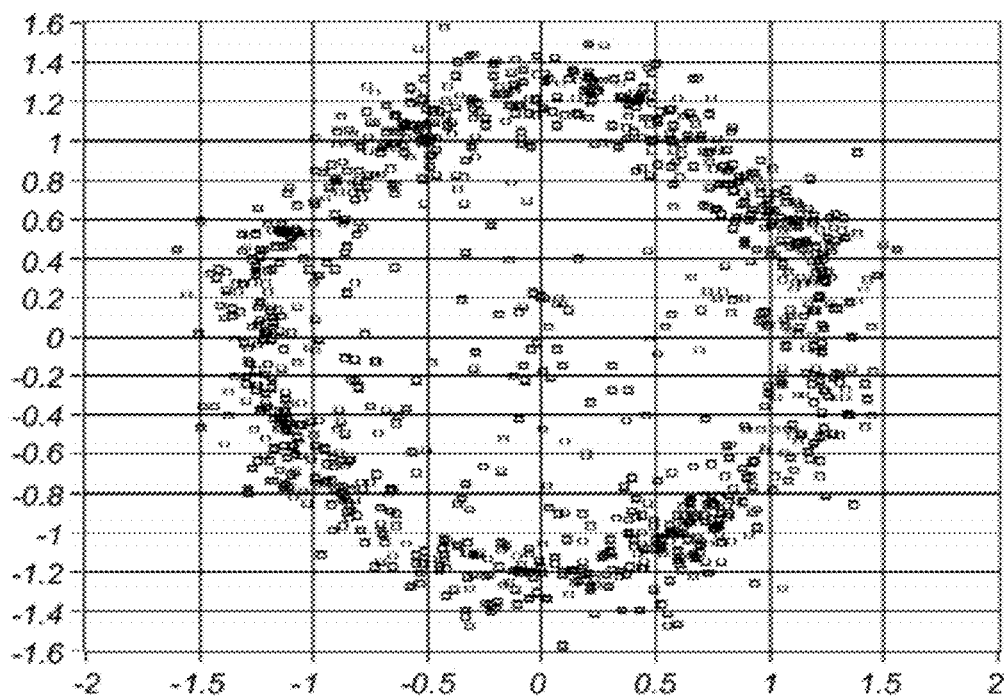

3. For the same number of received symbols (1555) of a constant-amplitude continuous-phase frequency-modulated signal such as GMSK, the VMA converges to a significantly lower residual distortion as compared to the CMA for the same channel conditions and same signal-to-noise ratio. FIG. 2B shows the constellation plot of a channel-affected GMSK signal extracted from a GSM burst (whose actual constellation diagram is shown in FIG. 2A). FIGS. 2C and 2D show the constellation diagrams after equalization using CMA and VMA respectively. As is clearly evident from the plots, the equalized output of VMA resembles the original constellation more than what is obtained using CMA blind equalization. The observations were taken using the same channel and SNR values as stated earlier.

Figure 3:
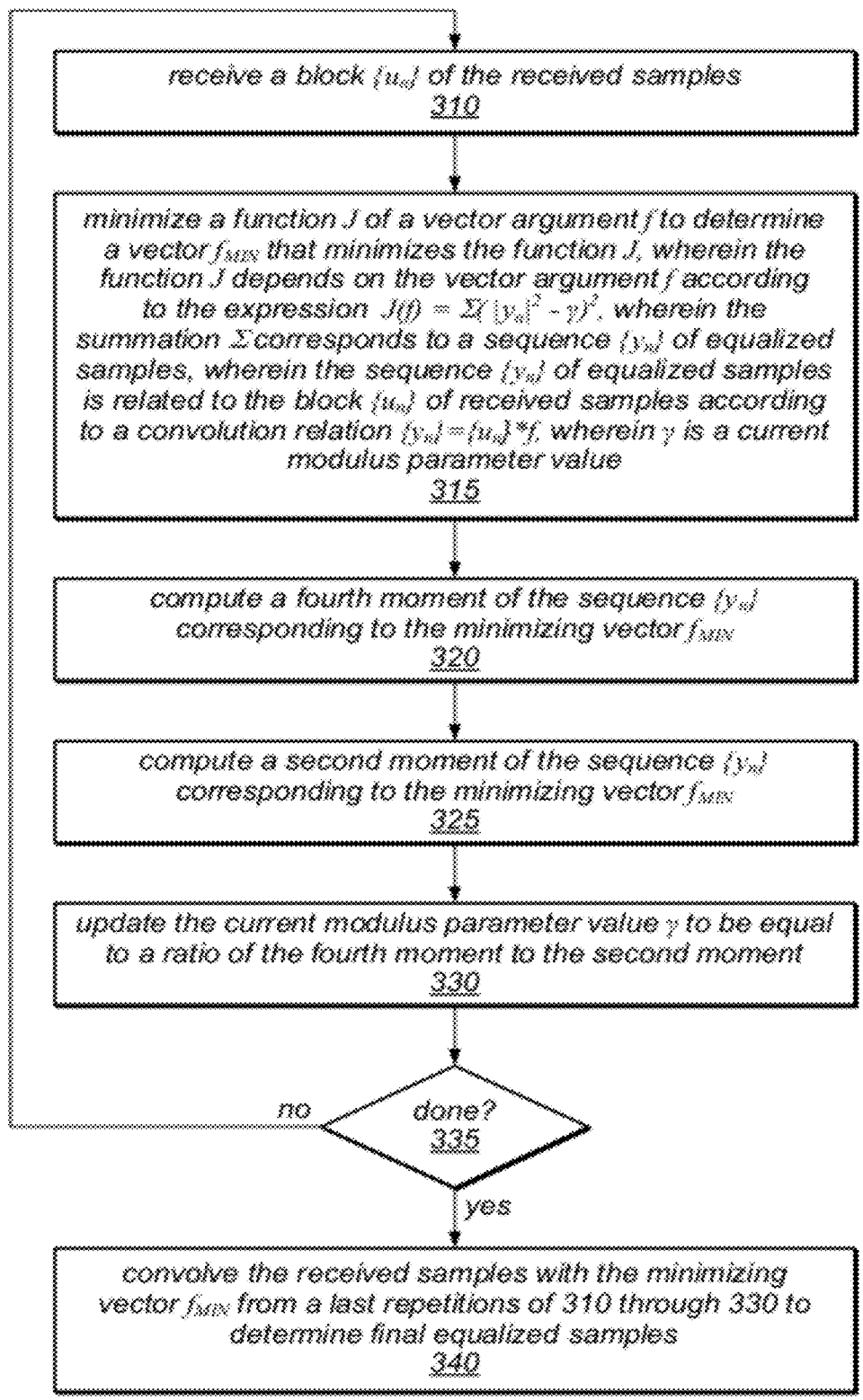
FIG. 3 is a flowchart illustrating one embodiment of a method for performing blind equalization.

In one set of embodiments, a method for performing blind equalization on received samples may include a set of operations as shown in FIG. 3. The embodiments of the variable modulus algorithm (VMA) described above may be interpreted as embodiments of the method of FIG. 3.

At 310, a processor may receive a block $\{u_n\}$ of the received samples, e.g., as variously described above.

At 315, the processor may minimize a function J of a vector argument f to determine a minimizing vector $f_{MIN}$, wherein the function J depends on the vector argument f according to the expression $$J(f) = \Sigma(|y_n|^2 - \gamma)^2,$$

wherein the summation $\Sigma$ corresponds to a sequence $\{y_n\}$ of equalized samples, wherein the sequence $\{y_n\}$ of equalized samples is related to the block $\{u_n\}$ of received samples according to a convolution relation $\{y_n\} = \{u_n\} * f$, wherein $\gamma$ is a current modulus parameter value. The summation $\Sigma$ includes one term of the form $(|y_n|^2 - \gamma)^2$ for each sample $y_n$ in the sequence $\{y_n\}$ It is noted that the minimization of the function J(f) is equivalent to the minimization of the function kJ(f), where k is any positive real value. In other words, the multiplication by positive scalar k does not change the location of the minimum. Thus, e.g., it is not necessary to perform the multiplication by (1/L) shown in the cost function of expression (5).

At 320, the processor may compute a fourth moment of the sequence $\{y_n\}$ corresponding to the minimizing vector $f_{MIN}$. The fourth moment of the sequence $\{y_n\}$ is defined as $E[|y_n|^4]$.

At 325, the processor may compute a second moment of the sequence $\{y_n\}$ corresponding to the minimizing vector $f_{MIN}$. The second moment of the sequence $\{y_n\}$ is defined as $E[|y_n|^2]$.

At 330, the processor may update the current modulus parameter value $\gamma$ to be equal to a ratio of the fourth moment to the second moment.

At 335, the processor may repeat operations 310 through 330 until a termination condition is satisfied, e.g., as variously described above.

At 340, the processor may convolve the received samples with the minimizing vector $f_{MIN}$ from a last of the repetitions of operations 310 through 330 in order to determine final equalized samples. In the above discussion of the VMA, this last minimizing vector $f_{MIN}$ is referred to as $f_{OPT}$.

In some embodiments, the termination condition is the condition that a change in the current modulus parameter value $\gamma$ between successive repetitions of operations 310 through 330 is smaller than a predetermined threshold, e.g., as described above.

In some embodiments, the method may further include: displaying a constellation plot of the final equalized samples via a display device, e.g., as shown in FIG. 1.

In some embodiments, the method may also include: receiving user input identifying a modulation type and constellation order after the displaying of the constellation plot; and demodulating the final equalized samples based on the identified modulation type and the identified constellation order in order to obtain a bit sequence. Upon viewing the displayed constellation plot, the modulation type and constellation order may be apparent to the user. (The system of the present invention may include a graphical user interface allowing the user to assert said identification by selecting from a set of known modulation types.) The bit sequence may be further processed to extract a stream of information bits. The information bits may be converted to an analog signal; the analog signal may be used to drive an output device (such as a display device or speaker).

In some embodiments, the method may also include: performing a cluster analysis (e.g., a K-means cluster analysis) on the final equalized samples to determine a constellation order implicit in the received samples.

In some embodiments, the process of minimizing the function J includes performing a stochastic gradient descent algorithm, e.g., as described above in connection with the VMA.

In some embodiments, the method operates without any a priori knowledge of the modulation type used by a transmitter to form the received samples.

In some embodiments, a next repetition of said minimizing starts with the minimizing vector $f_{MIN}$ determined in a current repetition of said minimizing, e.g., as described above in connection with the VMA.

Figure 4:
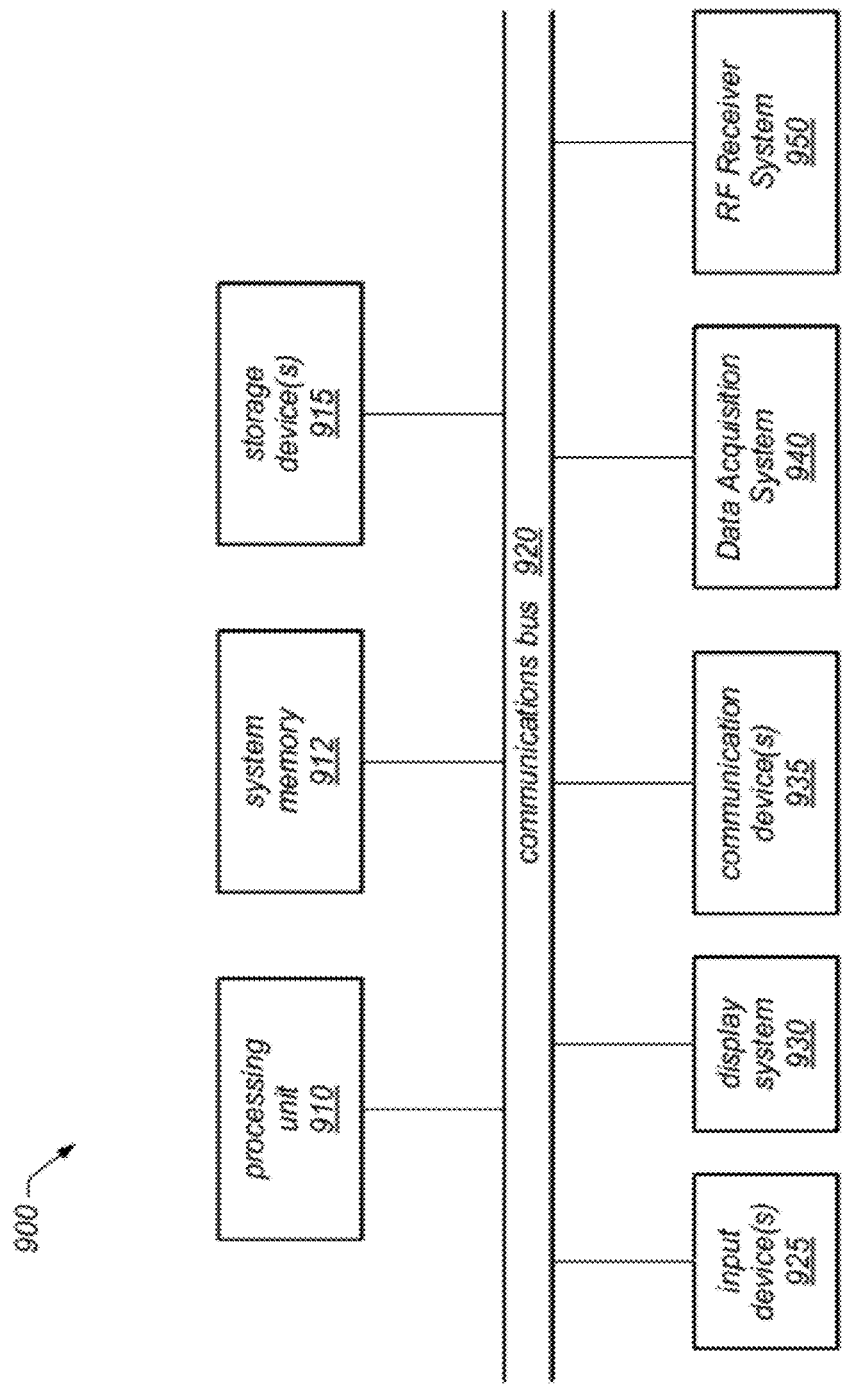
FIG. 4 illustrates one embodiment of a computer system may be used to perform any of the method embodiments described herein.

FIG. 4 illustrates one embodiment of a computer system 900 that may be used to perform any of the method embodiments described herein, or, any combination of the method embodiments described herein, or any subset of any of the method embodiments described herein, or, any combination of such subsets.

Computer system 900 may include a processing unit 910, a system memory 912, a set 915 of one or more storage devices, a communication bus 920, a set 925 of input devices, and a display system 930.

System memory 912 may include a set of semiconductor devices such as RAM devices (and perhaps also a set of ROM devices).

Storage devices 915 may include any of various storage devices such as one or more memory media and/or memory access devices. For example, storage devices 915 may include devices such as a CD/DVD-ROM drive, a hard disk, a magnetic disk drive, magnetic tape drives, etc.

Processing unit 910 is configured to read and execute program instructions, e.g., program instructions stored in system memory 912 and/or on one or more of the storage devices 915. Processing unit 910 may couple to system memory 912 through communication bus 920 (or through a system of interconnected busses). The program instructions configure the computer system 900 to implement a method, e.g., any of the method embodiments described herein, or, any combination of the method embodiments described herein, or, any subset of any of the method embodiments described herein, or any combination of such subsets.

Processing unit 910 may include one or more processors (e.g., microprocessors).

One or more users may supply input to the computer system 900 through the input devices 925. Input devices 925 may include devices such as a keyboard, a mouse, a touch-sensitive pad, a touch-sensitive screen, a graphics tablet, a track ball, a light pen, a data glove, eye orientation and/or head orientation sensors, a microphone (or set of microphones), or any combination thereof.

The display system 930 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 900 may include other devices, e.g., devices such as one or more graphics accelerators, one or more speakers, a sound card, a video camera and a video card.

In some embodiments, computer system 900 may include one or more communication devices 935, e.g., a network interface card for interfacing with a computer network. In one embodiment, computer system 900 may receive a modulated signal (e.g., a modulated RF signal) and perform signal processing operations on the modulated signal using such a communication device.

In some embodiments, the communication devices may include a reconfigurable I/O (RIO) board that includes one or more programmable hardware elements (PHEs), one or more A/D converters and additional circuitry. The RIO board is programmable to achieve a user-desired configuration of input and/or output processing, e.g., via a program written using LabVIEW FPGA. In some embodiments, the additional circuitry of the RIO board may include circuitry optimized for various kinds of signal processing operations and/or circuitry configured for signal amplification, carrier signal generation and synchronization, clock signal generation and synchronization, RF down-conversion, any of various kinds of demodulation, etc. The RIO board may receive an input signal, down-convert the input signal to baseband, digitize the baseband signal, and make the digitized baseband samples available to the computer system 900 for further processing, e.g., processing according to any of the method embodiments disclosed herein.

In some embodiments, the reconfigurable I/O board is one of the RIO boards provided by National Instrument Corporation.

The computer system may be configured with a software infrastructure including an operating system, and perhaps also, one or more graphics APIs (such as OpenGL®, Direct3D, Java 3D™). In some embodiments, the software infrastructure may include LabVIEW and/or LabVIEW FPGA, which are software products of National Instruments Corporation.

In some embodiments, the computer system 900 may be configured for coupling to a data acquisition system 940. The data acquisition system 940 is configured to receive analog inputs signals, to digitize the analog input signals, and to make those digitized signals available to the computer system 900. The data acquisition system 940 may operate under the control of the software executing on processor 910.

In some embodiments, the computer system 900 may be configured to interface with a specialized receiver system 950, e.g., an off-the-shelf receiver system designed for capturing radio signals (such as RF signals, wireless LAN signals, etc.), down-converting the captured signals, and sampling the down-converted signals.

Figure 5:
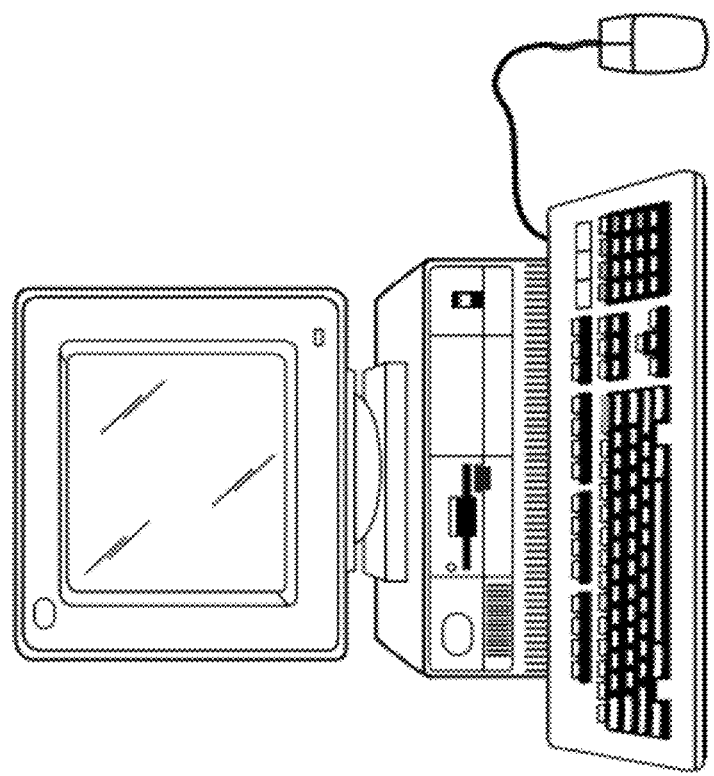
FIG. 5 illustrates one embodiment of the computer system of FIG. 4.

FIG. 5 illustrates one possible embodiment 900A for computer system 900.

Figure 6:
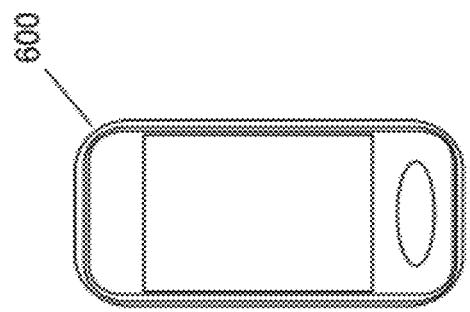
FIG. 6 illustrates an exemplary wireless device, such as a wireless telephone, which may implement embodiments of the invention.

FIG. 6 illustrates an exemplary wireless device 600, such as a wireless telephone, which may implement embodiments of the invention.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for performing blind equalization on received samples, the method comprising:
   (a) receiving at a computer system a block $\{u_n\}$ of the received samples;
   (b) minimizing a function J of a vector argument f to determine a minimizing vector $f_{MIN}$, wherein said minimizing is performed by the computer system, wherein the function J depends on the vector argument f according to the expression $J(f)=\Sigma(|y_n|^2-\gamma)^2$, wherein the summation $\Sigma$ corresponds to a sequence $\{y_n\}$ of equalized samples, wherein the sequence $\{y_n\}$ of equalized samples is related to the block $\{u_n\}$ of received samples according to a convolution relation $\{y_n\}=\{u_n\}*f$, wherein $\gamma$ is a current modulus parameter value;
   (c) computing a fourth moment of the sequence $\{y_n\}$ corresponding to the minimizing vector $f_{MIN}$, wherein said computing the fourth moment is performed by the computer system;
   (d) computing a second moment of the sequence $\{y_n\}$ corresponding to the minimizing vector $f_{MIN}$, wherein said computing the second moment is performed by the computer system;
   (e) updating the current modulus parameter value $\gamma$ to be equal to a ratio of the fourth moment to the second moment, wherein said updating the current modulus parameter value $\gamma$ is performed by the computer system;
   repeating (a) through (e) until a termination condition is satisfied, wherein said repeating is performed by the computer system;
   convolving the received samples with the minimizing vector $f_{MIN}$ from a last of said repetitions of (a) through (e) to determine final equalized samples, wherein said convolving is performed by the computer system.

2. The method of claim 1, wherein the termination condition is the condition that a change in the current modulus parameter value y between successive repetitions of (a) through (e) is smaller than a predetermined threshold.

3. The method of claim 1, further comprising:
   displaying a constellation plot of the final equalized samples via a display device.

4. The method of claim 3, further comprising:
   receiving user input identifying a modulation type and constellation order after said displaying the constellation plot;
   demodulating the final equalized samples based on the identified modulation type and identified constellation order in order to obtain a bit sequence.

5. The method of claim 1, further comprising:
   performing a cluster analysis on the final equalized samples to determine a constellation order implicit in the received samples; and
   displaying an indication of the constellation order via the display device.

6. The method of claim 1, wherein said minimizing the function J comprises performing a stochastic gradient descent algorithm.

7. The method of claim 1, wherein said method operates without any a priori knowledge of the modulation type used to form the received samples.

8. The method of claim 1, wherein a next repetition of said minimizing starts with the minimizing vector $f_{MIN}$ determined in a current repetition of said minimizing.

9. A non-transitory computer-readable memory medium having stored thereon program instructions executable by a computer system, wherein the program instructions, when executed by the computer system, cause the computer system to perform a method of blind equalization on received samples, the method comprising:
   (a) receiving a block $\{u_n\}$ of the received samples;
   (b) minimizing a function J of a vector argument f to determine a minimizing vector $f_{MIN}$, wherein the function J depends on the vector argument f according to the expression $$J(f)=\Sigma(|y_n|^2-\gamma)^2,$$

wherein the summation $\Sigma$ corresponds to a sequence $\{y_n\}$ of equalized samples, wherein the sequence $\{y_n\}$ of equalized samples is related to the block $\{u_n\}$ of received samples according to a convolution relation $\{y_n\}=\{u_n\}*f$, wherein $\gamma$ is a current modulus parameter value;
   (c) computing a fourth moment of the sequence $\{y_n\}$ corresponding to the minimizing vector $f_{MIN}$;
   (d) computing a second moment of the sequence $\{y_n\}$ corresponding to the minimizing vector $f_{MIN}$;
   (e) updating the current modulus parameter value $\gamma$ to be equal to a ratio of the fourth moment to the second moment;
   repeating (a) through (e) until a termination condition is satisfied;
   convolving the received samples with the minimizing vector $f_{MIN}$ from a last of said repetitions of (a) through (e) to determine final equalized samples.

10. The memory medium of claim 9, wherein the termination condition is the condition that a change in the current modulus parameter value y between successive repetitions of (a) through (e) is smaller than a predetermined threshold.

11. The memory medium of claim 9, wherein the method further comprises:
    displaying a constellation plot of the final equalized samples via a display device.

12. The memory medium of claim 11, wherein the method further comprises:
    receiving user input identifying a modulation type and constellation order after said displaying the constellation plot;
    demodulating the final equalized samples based on the identified modulation type and identified constellation order in order to obtain a bit sequence.

13. The memory medium of claim 9, wherein said minimizing the function J comprises performing a stochastic gradient descent algorithm.

14. The memory medium of claim 9, wherein a next repetition of said minimizing starts with the minimizing vector $f_{MIN}$ determined in a current repetition of said minimizing.

15. A computer system for performing blind equalization on received samples, the computer system comprising:
    a processor; and
    memory storing program instructions, wherein the program instructions, when executed by the processor, cause the processor to:
    (a) receive a block $\{u_n\}$ of the received samples;
    (b) minimize a function J of a vector argument f to determine a minimizing vector $f_{MIN}$, wherein the function J depends on the vector argument f according to the expression $$J(f)=\Sigma(|y_n|^2-\gamma)^2,$$

wherein the summation $\Sigma$ corresponds to a sequence $\{y_n\}$ of equalized samples, wherein the sequence $\{y_n\}$ of equalized samples is related to the block $\{u_n\}$ of received samples according to a convolution relation $\{y_n\}=\{u_n\}*f$, wherein $\gamma$ is a current modulus parameter value;

(c) compute a fourth moment of the sequence $\{y_n\}$ corresponding to the minimizing vector $f_{MIN}$;

(d) compute a second moment of the sequence $\{y_n\}$ corresponding to the minimizing vector $f_{MIN}$;

(e) update the current modulus parameter value $\gamma$ to be equal to a ratio of the fourth moment to the second moment;

repeat (a) through (e) until a termination condition is satisfied;

convolve the received samples with the minimizing vector $f_{MIN}$ from a last of said repetitions of (a) through (e) to determine final equalized samples.

16. The computer system of claim 15, wherein the termination condition is the condition that a change in the current modulus parameter value γ between successive repetitions of (a) through (e) is smaller than a predetermined threshold.

17. The computer system of claim 15, further comprising a display device, wherein the program instructions, when executed by the processor, further cause the processor to display a constellation plot of the final equalized samples via the display device.

18. The computer system of claim 15, wherein the processor includes a programmable hardware element.

19. The computer system of claim 15, wherein said minimize the function J comprises performing a stochastic gradient descent algorithm.

20. The computer system of claim 15, wherein a next repetition of said minimize starts with the minimizing vector $f_{MIN}$ determined in a current repetition of said minimizing.

* * * * *